United States Patent
Magaki et al.

(10) Patent No.: US 9,103,094 B2
(45) Date of Patent: Aug. 11, 2015

(54) HYBRID WORK MACHINE AND METHOD OF CONTROLLING SAME

(71) Applicant: SUMITOMO(S.H.I.) CONSTRUCTION MACHINERY CO., LTD., Tokyo (JP)

(72) Inventors: Hideto Magaki, Chiba (JP); Noriyuki Sakai, Chiba (JP); Kiminori Sano, Chiba (JP)

(73) Assignee: SUMITOMO(S.H.I.) CONSTRUCTION MACHINERY CO., LTD., Tokyo (JP)

(*) Notice: Subject to any disclaimer, the term of this patent is extended or adjusted under 35 U.S.C. 154(b) by 0 days.

(21) Appl. No.: 14/084,809

(22) Filed: Nov. 20, 2013

(65) Prior Publication Data

US 2014/0074337 A1    Mar. 13, 2014

Related U.S. Application Data

(63) Continuation of application No. PCT/JP2012/065168, filed on Jun. 13, 2012.

(30) Foreign Application Priority Data

Jun. 14, 2011 (JP) ................. 2011-132505

(51) Int. Cl.
| | | |
|---|---|---|
| *B60L 11/00* | (2006.01) | |
| *E02F 9/20* | (2006.01) | |
| *B60K 6/485* | (2007.10) | |
| *B60W 10/08* | (2006.01) | |
| *B60W 20/00* | (2006.01) | |

(Continued)

(52) U.S. Cl.
CPC .............. *E02F 9/2075* (2013.01); *B60K 6/485* (2013.01); *B60W 10/06* (2013.01); *B60W 10/08* (2013.01); *B60W 20/00* (2013.01); *B60W 20/10* (2013.01); *B60W 20/108* (2013.01); *B60W 30/1843* (2013.01); *B60W 30/1884* (2013.01); *B60W 2300/17* (2013.01); *B60W 2510/0676* (2013.01); *B60W 2510/083* (2013.01); *Y02T 10/6226* (2013.01); *Y02T 10/6286* (2013.01); *Y10S 903/903* (2013.01)

(58) Field of Classification Search
USPC .............................................. 701/22, 50, 99
See application file for complete search history.

(56) References Cited

U.S. PATENT DOCUMENTS

| | | |
|---|---|---|
| 6,428,444 B1 | 8/2002 | Tabata |
| 2005/0160727 A1 | 7/2005 | Nakamura et al. |
| 2011/0251746 A1 | 10/2011 | Wu et al. |

FOREIGN PATENT DOCUMENTS

| | | |
|---|---|---|
| JP | 2001-088586 | 4/2001 |
| JP | 2004-190582 | 7/2004 |

(Continued)

OTHER PUBLICATIONS

International Search Report mailed on Jul. 17, 2012.

*Primary Examiner* — Kim T Nguyen
(74) *Attorney, Agent, or Firm* — IPUSA, PLLC

(57) ABSTRACT

A hybrid work machine includes an engine, a motor generator connected to the engine, an electric energy storage unit configured to store electric power generated by the motor generator, and a control part configured to control driving of the motor generator. The control part is configured to control the driving of the motor generator so that an assist output of the motor generator increases, based on an external condition of the engine.

6 Claims, 10 Drawing Sheets

(51) Int. Cl.
*B60W 10/06* (2006.01)
*B60W 30/184* (2012.01)
*B60W 30/188* (2012.01)

(56) References Cited

FOREIGN PATENT DOCUMENTS

| | | |
|---|---|---|
| JP | 2005-155251 | 6/2005 |
| JP | 2007-238039 | 9/2007 |
| JP | 2008-012963 | 1/2008 |
| JP | 2008-120266 | 5/2008 |
| JP | 2008-232032 | 10/2008 |
| JP | 2009-173235 * | 8/2009 ............ B60W 10/06 |
| JP | 2009-261096 | 11/2009 |
| JP | 2010-242444 | 10/2010 |
| JP | 2011-011648 | 1/2011 |
| JP | 2011-025740 | 2/2011 |
| WO | WO 2008/059337 | 5/2008 |

* cited by examiner ated the U.S., which claims priority to Japanese Patent Application
HYBRID WORK MACHINE AND METHOD OF CONTROLLING SAME

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2012/065168, filed on Jun. 13, 2012 and designated the U.S., which claims priority to Japanese Patent Application No. 2011-132505, filed on Jun. 14, 2011. The entire contents of the foregoing applications are incorporated herein by reference.

BACKGROUND

1. Technical Field

The present invention relates to hybrid work machines where an engine is assisted by an electric motor.

2. Description of Related Art

In recent years, more and more work machines have become hybrid in order to improve the energy efficiency of work machines. In hybrid work machines, it is possible to efficiently drive a hydraulic working element by driving a hydraulic pump with small engine output by assisting an engine using an electric motor that is driven with electric power from an electric energy storage unit. (See, for example, Japanese Unexamined Patent Publication No. 2009-261096 [Patent Document 1].)

SUMMARY

According to an embodiment of the present invention, a hybrid work machine includes an engine, a motor generator connected to the engine, an electric energy storage unit configured to store electric power generated by the motor generator, and a control part configured to control driving of the motor generator, wherein the control part is configured to control the driving of the motor generator so that an assist output of the motor generator increases, based on an external condition of the engine.

According to another embodiment of the present invention, a method of controlling a hybrid work machine includes detecting a change in an external condition of an engine and controlling driving of the motor generator so that an assist output delivered by the motor generator to assist the engine increases, based on the external condition.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which.

DETAILED DESCRIPTION

According to the hybrid work machine disclosed in Patent Document 1, an engine is assisted when necessary by controlling a motor generator that operates as both an electric motor and a generator. The output value of the motor generator is determined based on output required by an electric drive part, output required by a hydraulic drive part, and output required to maintain the state of charge of the electric energy storage device of the electric energy storage unit. That is, the output of the motor generator for assisting the engine is determined by operating conditions such as the outputs required by the electric drive part, the hydraulic drive part, and the electric energy storage unit of the hybrid work machine.

The output of the engine of the hybrid work machine may be reduced depending on external conditions (external factors) such as engine cooling water temperature, outside air temperature (engine cooling water temperature), and fuel composition. For example, when the engine cooling water temperature excessively increases, the engine is overheated, so that the output is reduced. Therefore, it is desired to develop an assisting method that makes it possible to assist an engine in response to such a decrease in the output of the engine due to an external factor.

No documents have been found that propose an assisting method responsive to a surrounding environment.

According to an aspect of the present invention, the assist output of a motor generator is increased based on an external condition of an engine. Therefore, for example, even when the output of the engine decreases because of a change in the external condition, it is possible to maintain the output of the engine by assisting the engine using the motor generator. As a result, it is possible to prevent a decrease in the working efficiency of a work machine by maintaining the output of a hydraulic pump driven with the output of the engine.

Next, a description is given, with reference to the drawings, of an embodiment.

Figure 1:
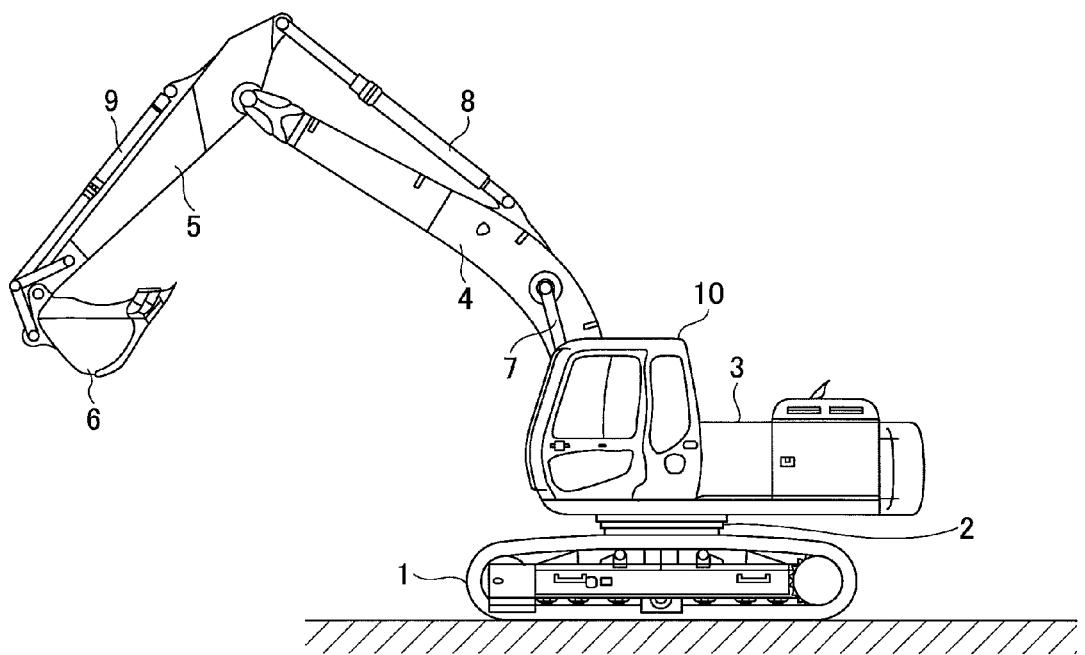
FIG. 1 is a side view of a hybrid shovel.

FIG. 1 is a side view of a hybrid shovel, which is an example work machine to which an embodiment of the present invention is applied. The shovels to which embodiments of the present invention are applied are not limited to hybrid shovels. Embodiments of the present invention may be applied to shovels of other configurations as long as the shovels include a drive element (for example, a generator) that may be driven by an engine to apply a load to the engine.

An upper-part turning body 3 is mounted through a turning mechanism 2 on a lower-part traveling body 1 of the hybrid shovel illustrated in FIG. 1. A boom 4 is attached to the upper-part turning body 3. An arm 5 is attached to the end of the boom 4. A bucket 6 is attached to the end of the arm 5. The boom 4, the arm 5, and the bucket 6 are hydraulically driven by a boom cylinder 7, an arm cylinder 8, and a bucket cylinder 9, respectively. A cabin 10 is provided on and power sources such as an engine are mounted on the upper-part turning body 3.

Figure 2:
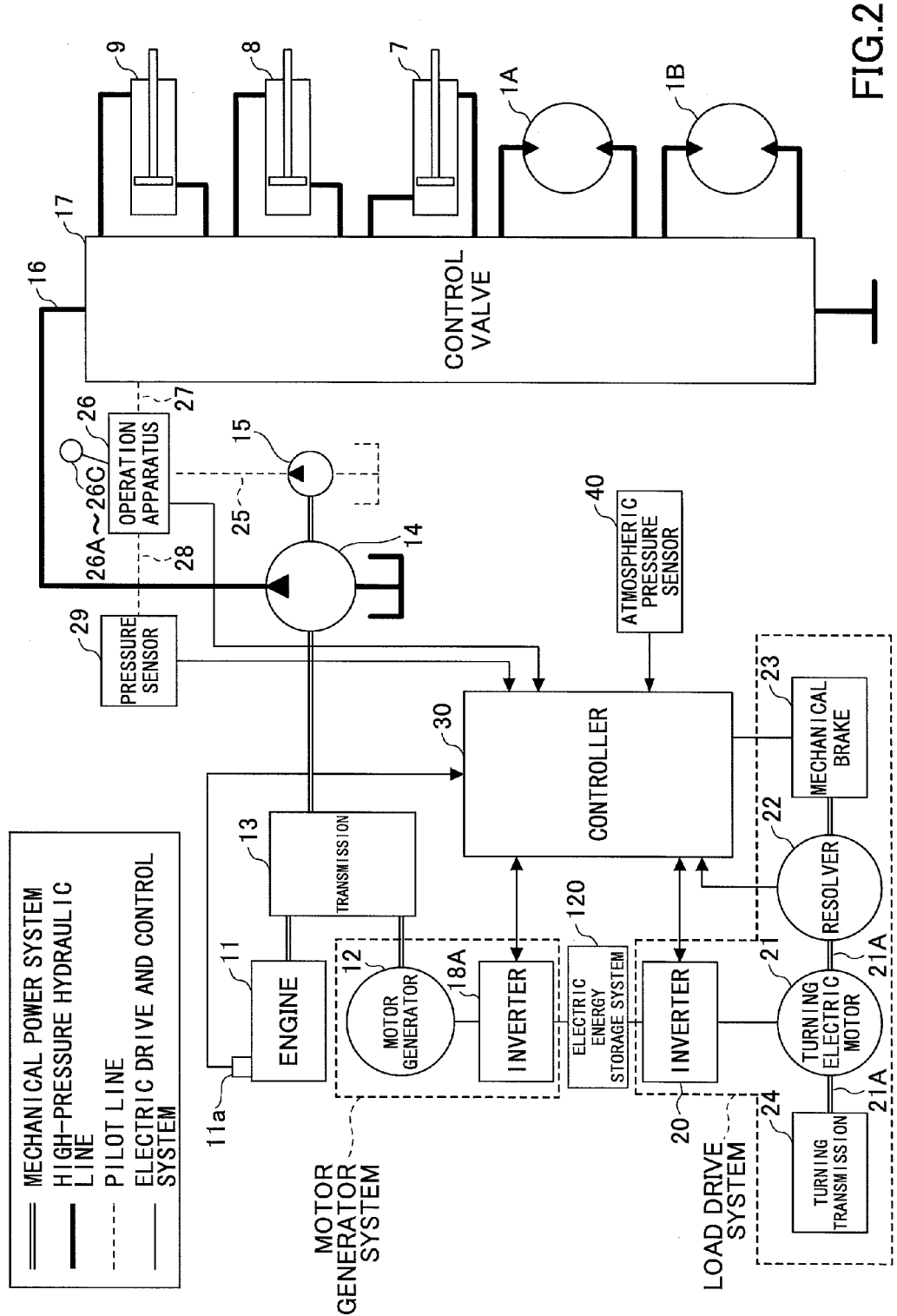
FIG. 2 is a block diagram illustrating a configuration of a drive system of the hybrid shovel according to an embodiment.

FIG. 2 is a block diagram illustrating a configuration of a drive system of the hybrid shovel illustrated in FIG. 1. In FIG. 2, a mechanical power system, a high-pressure hydraulic line, a pilot line, and an electric drive and control system are indicated by a double line, a bold solid line, a broken line, and a fine solid line, respectively.

An engine 11 as a mechanical drive part and a motor generator 12 as an assist drive part are connected to a first input shaft and a second input shaft, respectively, of a transmission 13. A main pump 14 and a pilot pump 15 are connected as hydraulic pumps to the output shaft of the transmission 13. A control valve 17 is connected to the main pump 14 via a high-pressure hydraulic line 16. The hydraulic pump 14 is a variable displacement hydraulic pump, and its discharge flow rate may be controlled by adjusting the stroke length of a piston by controlling the angle of a swash plate (a tilt angle).

The control valve 17 is a controller that controls a hydraulic system in the hybrid shovel. Hydraulic motors 1A (right) and 1B (left) for the lower-part traveling body 1, the boom cylinder 7, the arm cylinder 8, and the bucket cylinder 9 are connected to the control valve 17 via high-pressure hydraulic lines.

An electric energy storage system 120 including an electric energy storage device is connected to the motor generator 12 via an inverter 18A. Furthermore, an operation apparatus 26 is connected to the pilot pump 15 via a pilot line 25. The operation apparatus 26 includes a lever 26A, a lever 26B, and a pedal 26C. The lever 26A, the lever 26B, and the pedal 26C are connected to the control valve 17 and a pressure sensor 29 via hydraulic lines 27 and 28, respectively. The pressure sensor 29 is connected to a controller 30 that controls the driving of an electric system.

The hybrid shovel illustrated in FIG. 2, which has an electric turning mechanism, is provided with a turning electric motor 21 in order to drive the turning mechanism 2. The turning electric motor 21 as an electric working element is connected to the electric energy storage system 120 via an inverter 20. A resolver 22, a mechanical brake 23, and a turning transmission 24 are connected to a rotating shaft 21A of the turning electric motor 21. The turning electric motor 21, the inverter 20, the resolver 22, the mechanical brake 23, and the turning transmission 24 constitute a load drive system.

The controller 30 is a control unit serving as a main control part that controls the driving of the hybrid shovel. The controller 30 includes a processor including a CPU (Central Processing Unit) and an internal memory. The controller 30 is a device implemented by the CPU executing a drive control program contained in the internal memory.

The controller 30 converts a signal fed from the pressure sensor 29 into a speed command, and controls the driving of the turning electric motor 21. The signal fed from the pressure sensor 29 corresponds to a signal that represents the amount of operation in the case of operating the operation apparatus 26 to turn the turning mechanism 2.

The controller 30 controls the operation (switches the electric motor [assist] operation and the generator operation) of the motor generator 12. The controller 30 also controls the charge and discharge of a capacitor 19 by controlling the driving of a step-up/step-down converter 100 (see FIG. 3) as a step-up/step-down control part. The controller 30 controls the charge and discharge of the capacitor 19 by controlling the switching of the step-up operation and the step-down operation of the step-up/step-down converter 100 based on the state of charge of the capacitor 19, the operating state (electric motor [assist] operation or generator operation) of the motor generator 12, and the operating state (power running operation or regenerative operation) of the turning electric motor 21. Furthermore, the controller 30 calculates the state of charge SOC of the electric energy storage device (capacitor) 19 based on the voltage value of the electric energy storage device detected by an electric power storage device voltage detecting part.

The engine 11 is provided with a water temperature meter 11a that detects the temperature of the cooling water. The detection value (water temperature value) of the water temperature meter 11a is fed to the controller 30. The controller 30 constantly monitors the detection value of the water temperature meter 11a, and controls the driving of the motor generator 12 based on the detection value of the water temperature meter 11a as described below.

The hybrid shovel according to this embodiment includes an atmospheric pressure sensor 40. The atmospheric pressure sensor 40 detects the ambient atmospheric pressure of the hybrid shovel, and feeds the detection value to the controller 30.

Figure 3:
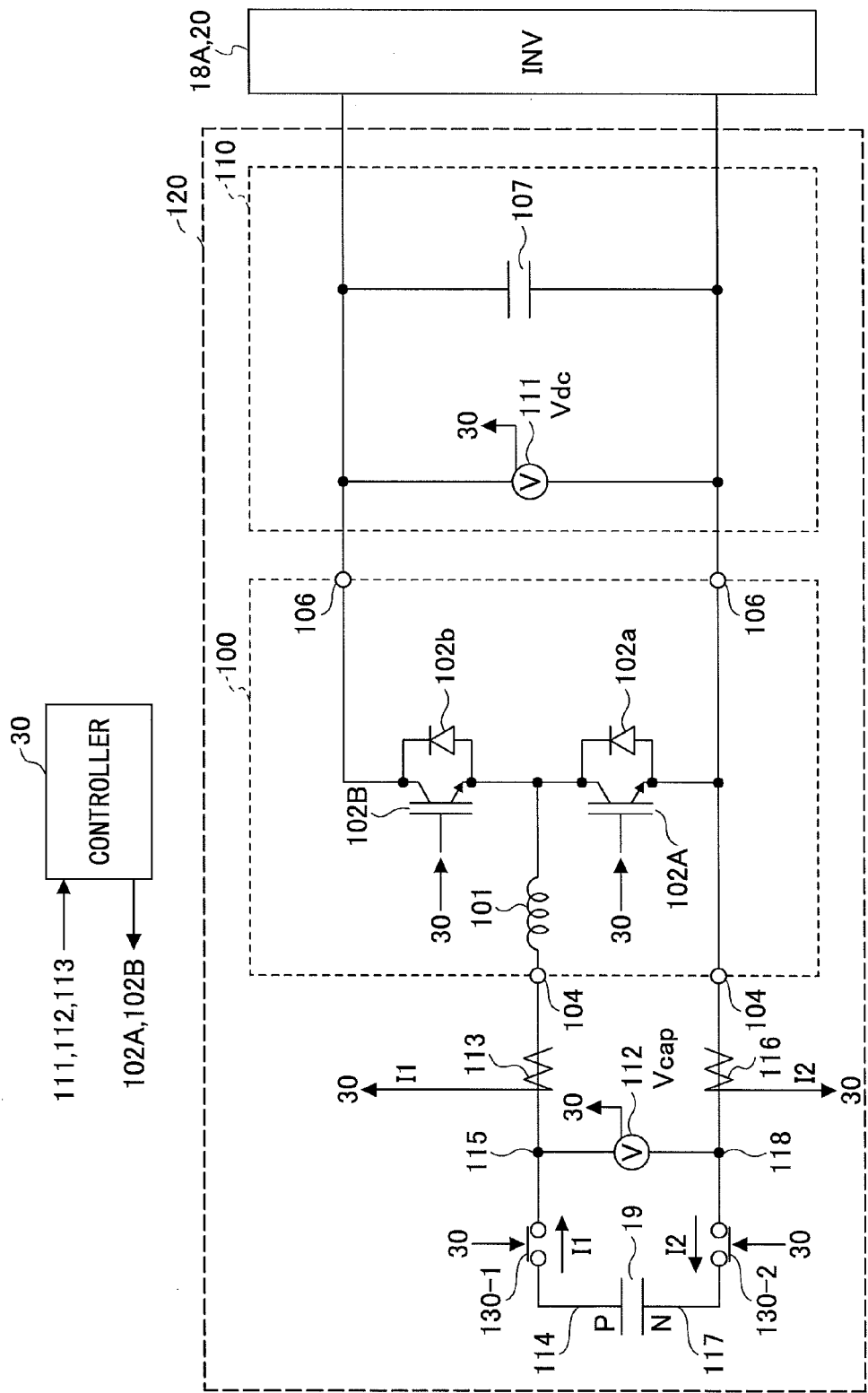
FIG. 3 is a circuit diagram of an electric energy storage system.

FIG. 3 is a circuit diagram of the electric energy storage system 120. The electric energy storage system 120 includes the capacitor 19 as an electric energy storage device, the step-up/step-down converter 100, and a DC bus 110. The DC bus 110 controls the transfer of electric power among the capacitor 19, the motor generator 12, and the turning electric motor 21. The capacitor 19 is provided with a capacitor voltage detecting part 112 for detecting a capacitor voltage Vcap and a capacitor current detecting part 113 for detecting a capacitor current I1. The capacitor voltage Vcap and the capacitor current I1 detected by the capacitor voltage detecting part 112 and the capacitor current detecting part 113, respectively, are fed to the controller 30.

The step-up/step-down converter 100 performs such control as the switching of a step-up operation and a step-down operation in accordance with the operating states of the motor generator 12 and the turning electric motor 21, so that the DC bus voltage value falls within a certain range. The DC bus 110 is provided between the inverters 18A and 20 and the step-up/step-down converter 100 to transfer electric power among the capacitor 19, the motor generator 12, and the turning electric motor 21.

The control of the switching of a step-up operation and a step-down operation by the step-up/step-down converter 100 is performed based on a DC bus voltage Vdc detected by a DC bus voltage detecting part 111, the capacitor voltage Vcap detected by the capacitor voltage detecting part 112, and the capacitor current I1 detected by the capacitor current detecting part 113.

In the configuration as described above, the electric power generated by the motor generator 12, which is an assist motor, is supplied to the DC bus 110 of the electric energy storage system 120 via the inverter 18A to be supplied to the capacitor 19 via the step-up/step-down converter 100. The electric power regenerated by the regenerative operation of the turning electric motor 21 is supplied to the DC bus 110 of the electric energy storage system 120 via the inverter 20, to be supplied to the capacitor 19 via the step-up/step-down converter 100.

The step-up/step-down converter 100 includes a reactor 101, a step-up IGBT (Insulated Gate Bipolar Transistor) 102A, a step-down IGBT 102B, power supply connection terminals 104 for connecting the capacitor 19, output terminals 106 for connecting the inverters 18A and 20, and a smoothing capacitor 107 inserted in parallel between the paired output terminals 106. The output terminals 106 of the step-up/step-down converter 100 and the inverters 18A and 20 are connected by the DC bus 110.

The reactor 101 has one end connected to a point between the step-up IGBT 102A and the step-down IGBT 102B and has the other end connected to one of the power supply connection terminals 104. The reactor 101 is provided to supply the DC bus 110 with the induced electromotive power generated with the turning-on/off of the step-up IGBT 102A.

The step-up IGBT 102A and the step-down IGBT 102B, which are constituted of bipolar transistors each having a MOSFET (Metal Oxide Semiconductor Field Effect Transistor) incorporated into its gate part, are semiconductor devices (switching elements) capable of high-speed switching with high power. The step-up IGBT 102A and the step-down IGBT 102B are driven by application of PWM voltage to their gate terminals by the controller 30. Diodes 102*a* and 102*b*, which are rectifying elements, are connected in parallel to the step-up IGBT 102A and the step-down IGBT 102B, respectively.

The capacitor 19 may be a chargeable and dischargeable electric energy storage device so as to enable transfer of electric power to and from the DC bus 110 via the step-up/step-down converter 100. In FIG. 3, the capacitor 19 is illustrated as an electric energy storage device. Alternatively, in place of the capacitor 19, a rechargeable battery, which is chargeable and dischargeable, such as a lithium ion battery, a lithium ion capacitor, or other form of power supply capable of transferring electric power may also be used.

The power supply connection terminals 104 and the output terminals 106 may be terminals to which the capacitor 19 and the inverters 18A and 20 may be connected. The capacitor voltage detecting part 112 that detects the capacitor voltage Vcap is connected between the paired power supply connection terminals 104. The DC bus voltage detecting part 111 that detects the DC bus voltage Vdc is connected between the paired output terminals 106.

The capacitor voltage detecting part 112 detects the voltage Vcap of the capacitor 19. The DC bus voltage detecting part 111 detects the voltage value Vdc of the DC bus 110. The smoothing capacitor 107 is an electric energy storage element inserted between the positive and the negative output terminal 106 to smooth the DC bus voltage Vdc. The voltage of the DC bus 110 is maintained at a predetermined voltage by this smoothing capacitor 107.

The capacitor current detecting part 113 is a detecting part that detects the value of an electric current flowing through the capacitor 19 on the positive terminal (P terminal) side of the capacitor 19, and includes a resistor for detecting electric current. That is, the capacitor current detecting part 113 detects the electric current I1 that flows through the positive terminal of the capacitor 19. On the other hand, a capacitor current detecting part 116 is a detecting part that detects the value of an electric current flowing through the capacitor 19 on the negative terminal (N terminal) side of the capacitor 19, and includes a resistor for detecting electric current. That is, the capacitor current detecting part 116 detects an electric current I2 that flows through the negative terminal of the capacitor 19.

In the step-up/step-down converter 100, at the time of raising the voltage of the DC bus 110, a PWM voltage is applied to the gate terminal of the step-up IGBT 102A, so that the induced electromotive force generated in the reactor 101 with the turning-on/off of the step-up IGBT 102A is supplied to the DC bus 110 via the diode 102*b* connected in parallel to the step-down IGBT 102B. As a result, the voltage of the DC bus 110 is raised.

At the time of lowering the voltage of the DC bus 110, a PWM voltage is applied to the gate terminal of the step-down IGBT 102B, so that regenerated electric power fed via the inverter 18A or 20 is supplied from the DC bus 110 to the capacitor 19 via the step-down IGBT 102B. As a result, the capacitor 19 is charged with the electric power stored in the DC bus 110, so that the voltage of the DC bus 110 is lowered.

According to this embodiment, in a power supply line 114 that connects the positive terminal of the capacitor 19 to the one of the power supply connection terminals 104 of the step-up/step-down converter 100, a relay 130-1 is provided as a breaker capable of breaking the power supply line 114. The relay 130-1 is placed between a connecting point 115, where the capacitor voltage detecting part 112 is connected to the power supply line 114, and the positive terminal of the capacitor 19. The relay 130-1 is caused to operate by a signal from the controller 30, and is capable of disconnecting the capacitor 19 from the step-up/step-down converter 100 by breaking the power supply line 114 from the capacitor 19.

In a power supply line 117 that connects the negative terminal of the capacitor 19 to the other of the power supply connection terminals 104 of the step-up/step-down converter 100, a relay 130-2 is provided as a breaker capable of breaking the power supply line 117. The relay 130-2 is placed between a connecting point 118, where the capacitor voltage detecting part 112 is connected to the power supply line 117, and the negative terminal of the capacitor 19. The relay 130-2 is caused to operate by a signal from the controller 30, and is capable of disconnecting the capacitor 19 from the step-up/step-down converter 100 by breaking the power supply line 117 from the capacitor 19. The capacitor 19 may be disconnected by breaking both the power supply line 114 on the positive terminal side and the power supply line 117 on the negative terminal side simultaneously, forming the relay 130-1 and the relay 130-2 as a single relay.

In practice, there is a drive part that generates PWM signals to drive the step-up IGBT 102A and the step-down IGBT 102B between the controller 30 and the step-up IGBT 102A and the step-down IGBT 102B. In FIG. 3, however, the drive part is omitted. Such a drive part may be implemented by either an electronic circuit or a processor.

According to this embodiment, in the hybrid shovel configured as described above, such control is performed as to prevent a decrease in the engine output and keep the output of the main pump 14 as constant as possible by assisting the engine 11 using the motor generator 12, when the engine output decreases because of a change in an external condition.

A description is given, taking engine cooling water temperature as an example as one of the external conditions that reduce the output of the engine 11. When the engine cooling water temperature (hereinafter referred to as "water temperature") excessively increases, the engine 11 is overheated, so that the combustion efficiency of the engine 11 decreases to decrease the engine output. When the engine output decreases, a force to drive the main pump (hydraulic pump) 14 is reduced, so that the output of the main pump 14 decreases. Therefore, when the water temperature of the engine 11 increases to some extent, the motor generator 12 is so controlled as to prevent a decrease in the output of the hydraulic pump by compensating for a decrease in the engine output by causing the motor generator 12 to perform an assist operation.

When the water temperature is in a normal range, such control is performed as to equalize an output Wa (a positive value in an electric motor state) of the motor generator 12 to a difference between an output Whyd of the main pump 14, which is a variable displacement hydraulic pump, and an output We of the engine 11 (Wa=Whyd−We). As a result, it is possible to output the sum of the output We of the engine 11 and the output Wa of the motor generator 12 to the main pump 14 (We+Wa=Whyd).

Figure 4:
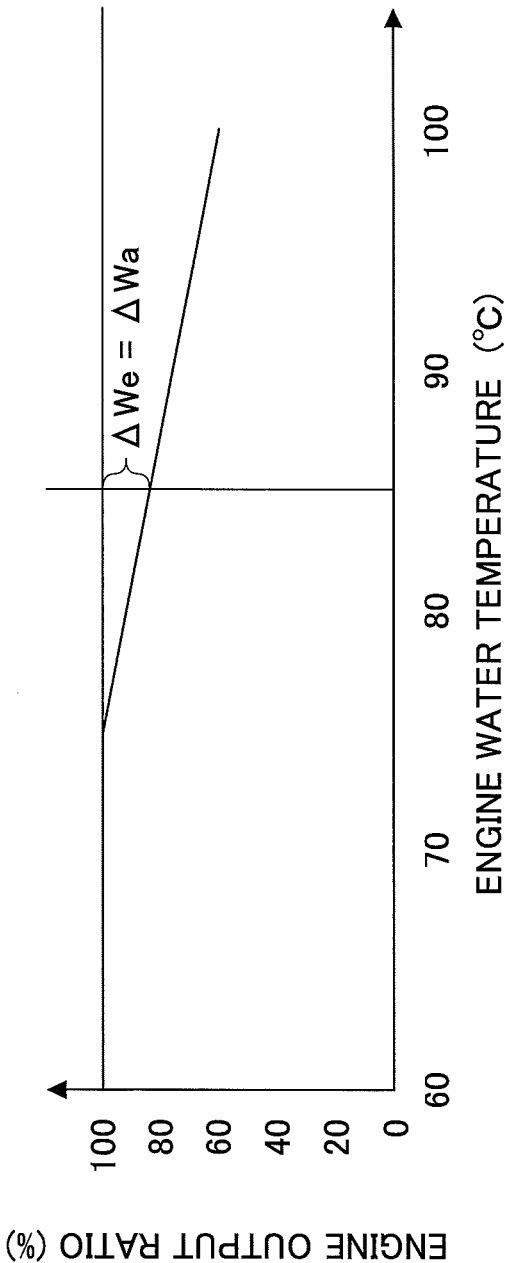
FIG. 4 is a graph illustrating the relationship between the engine water temperature and the engine output ratio.

On the other hand, when the water temperature excessively increases, the output of the engine 11 is limited to prevent the engine 11 from being overheated. FIG. 4 is a graph illustrating the relationship between the engine water temperature and the engine output ratio. The engine output ratio (%) is a value that expresses the ratio of the instantaneous engine output to the engine output at the time of normal water temperature in percentage.

When the water temperature increases so that the engine output is limited, the output of the engine 11 is reduced by the amount (ΔWe) by which the output of the engine 11 has been limited. Therefore, the output that can be delivered to the main pump 14 becomes ((We−ΔWe)+Wa=Whyd), so that the output of the main pump 14 also is reduced. Therefore, the assist output of the motor generator 12 is increased (ΔWa) by the amount (ΔWe) by which the engine output has been limited. As a result, the output that can be delivered to the main pump 14 becomes ((We−ΔWe)+Wa+ΔWa=Whyd), so that it is possible to maintain the output of the main pump 14. As a result, even when the shovel is operated in an environment where the water temperature of the engine 11 becomes high, it is possible to do the same work as usual, so that it is possible to prevent a decrease in working efficiency.

Figure 5:
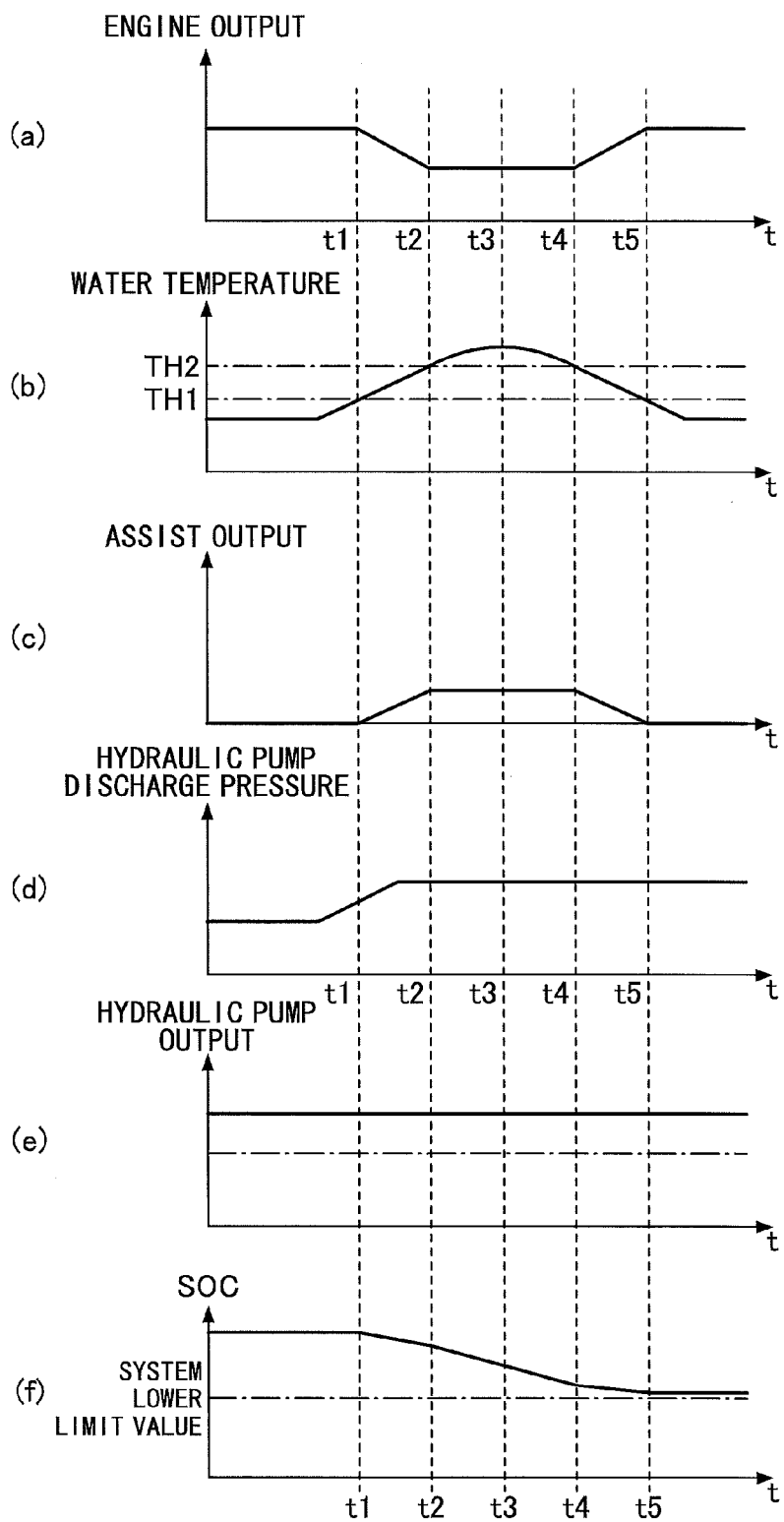
FIG. 5 illustrates graphs that illustrate changes in the assist output of a motor generator, etc., in the case where the engine water temperature excessively increases.

FIG. 5 illustrates graphs that illustrate changes in the assist output of the motor generator 12, etc., in the case where the water temperature of the engine 11 excessively increases. In FIG. 5, (b) indicates changes in the water temperature of the engine 11 and (a) indicates changes in the engine output with the changes in the water temperature. In FIG. 5, (c) indicates the assist output of the motor generator 12 controlled based on the changes in the water temperature. In FIG. 5, (d) indicates changes in the discharge output of the main pump 14 (corresponding to a load applied on the main pump 14) and (e) indicates the output of the main pump 14. In FIG. 5, (f) indicates the state of charge (SOC) of the electric energy storage part (capacitor) 19 of the electric energy storage system 120 that supplies electric power to the motor generator 12. The graphs illustrated in (a) and (c) through (f) of FIG. 5 are graphs that exhibit an average value in a time of approximately several minutes to several dozen minutes during work.

The control example illustrated in FIG. 5 is a control example in the case where it is possible to keep the state of charge SOC of the electric energy storage part 19 sufficiently higher than a system lower limit value even when supplying electric power to the motor generator 12 as illustrated in (f) of FIG. 5.

For example, when the shovel is operated at a location where the outside air temperature is high, the discharge pressure of the main pump 14 remains at a small value from the start of work to Time t1 because the workload is light as illustrated in (d) of FIG. 5. Then, it is assumed that the discharge pressure (load) of the main pump 14 (hydraulic pump) starts to increase before Time t1 to become a constant load between Time t1 and Time t2. At this point, the temperature of the cooling water (water temperature) of the engine 11 gradually increases with the increase in the discharge pressure of the main pump 14, and exceeds a first threshold TH1 at Time t1 to further increase. This first threshold TH1 is a temperature that is determined in advance while operating the engine 11, and is a temperature at which the output of the engine 11 starts to decrease when the water temperature exceeds the first threshold TH1. Accordingly, the output of the engine 11 starts to decrease after Time t1.

The water temperature meter 11a of the engine 11 constantly detects the water temperature, and feeds the value of the detected water temperature to the controller 30. The controller 30 constantly monitors the detected water temperature value from the water temperature meter 11a, and issues a command to assist the engine 11 by causing the motor generator 12 to perform an electric motor operation when the water temperature exceeds the first threshold TH1.

The discharge pressure of the main pump 14 stops increasing and becomes constant before Time t2. Therefore, the engine output stops decreasing at Time t2 and thereafter remains a substantially constant value.

Here, at Time t1, the motor generator 12 starts to assist the engine 11. Therefore, as illustrated in (c) of FIG. 5, the assist output of the motor generator 12 increases from Time t1 and increases until Time t2 to become constant from Time t2. As shown by the comparison of (a) of FIG. 5 and (c) of FIG. 5, the assist output increases from Time t1 at the same time that the engine output starts to decrease at Time t1. Therefore, the decrease in the engine output is compensated for by the assist output. Accordingly, the decrease in the engine output does not reduce the power supplied to the main pump 14. As a result, the output of the main pump 14 is kept constant from Time t1 to Time t4 as illustrated in (e) of FIG. 5.

Thus, even when the engine output decreases because of an increase in the water temperature, the decrease is compensated for by the assist output. Therefore, the hydraulic pressure supplied to a hydraulic working element can be kept sufficient without being reduced.

Part of the load on the engine 11 is covered by the assist output. Therefore, the actual load on the engine 11 decreases, and the water temperature becomes lower than a second threshold TH2 to gradually decrease after Time t4. This second threshold TH2 is a temperature that is determined in advance while operating the engine 11, and is a temperature at which the output of the engine 11 starts to increase when the water temperature becomes lower than the second threshold TH2. Accordingly, after Time t4, the output of the engine 11, which has decreased because of overheating, starts to increase.

Therefore, when the water temperature detected by the water temperature meter 11a becomes lower than the second threshold TH2, the controller 30 causes the assist output of the motor generator 12 to gradually decrease. The water temperature decreases to the first threshold TH1 at Time t5, and decreases thereafter to return to the original temperature before overheating. The assist output decreases from Time t4 to become zero at Time t5.

Thus, the assist output decreases from Time t4 at the same time that the engine output starts to increase at Time t4. Therefore, the assist output is reduced by the increase in the engine output. Accordingly, the increase in the engine output does not increase the power supplied to the main pump 14. As a result, the output of the main pump 14 is kept constant from Time t4 to Time t5 as illustrated in (e) of FIG. 5.

Here, the motor generator 12 is supplied with electric power from the capacitor 19 of the electric energy storage system 120 to deliver the above-described assist output. Therefore, as illustrated in (f) of FIG. 5, the state of charge SOC of the capacitor 19 starts to decrease at Time t1, when the electric motor operation (assist operation) of the motor generator 12 is started, and decreases until Time t4. At Time t4, the decrease in the SOC is reduced, and at Time t5, the SOC stops decreasing because the assist operation of the motor generator 12 is stopped. In the case of this example, the SOC is sufficiently high before causing the motor generator 12 to perform an assist operation, and the time of the assist operation of the motor generator 12 is not long. Therefore, the SOC does not become lower than the system lower limit value until the assist output is stopped (until Time t5).

Thus, according to the control example illustrated in FIG. 5, the driving of the motor generator 12 is controlled so that the assist is started when the water temperature increases to the first threshold TH1 and the assist is stopped when the water temperature becomes lower than the second threshold TH2. As a result, even when the engine output is decreased because of the overheat of the engine 11, it is possible to compensate for the decrease in the engine output with the assist output of the motor generator 12, so that it is possible to maintain the output of the main pump 14 at the same level as in a normal state.

Next, a description is given of a control example in the case where it becomes unable to keep the state of charge SOC of the electric energy storage part (capacitor) 19 higher than the system lower limit value during the assist operation of the motor generator 12.

Figure 6:
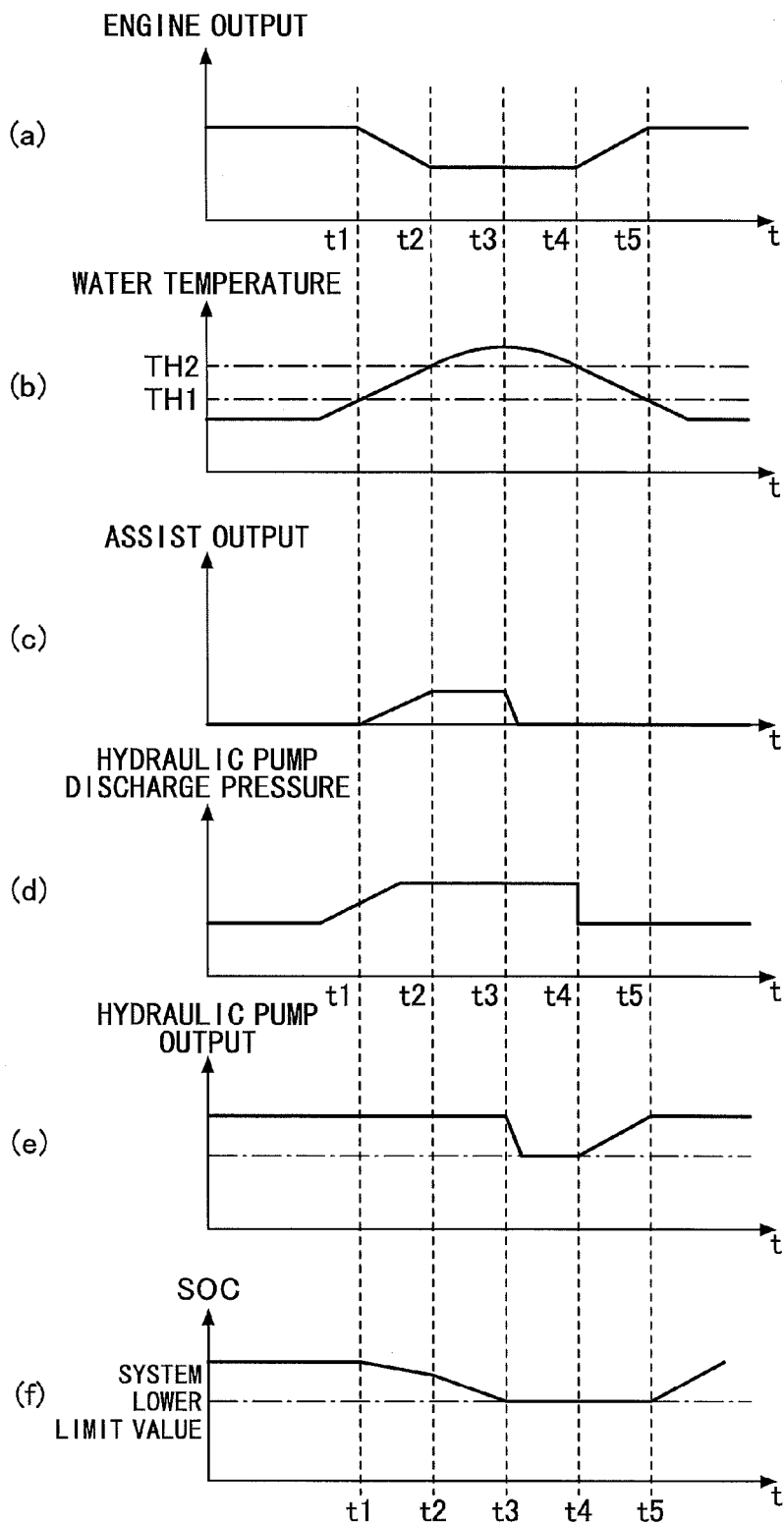
FIG. 6 illustrates graphs that illustrate changes in the assist output of the motor generator, etc., in the case where the engine water temperature excessively increases.

Like FIG. 5, FIG. 6 illustrates graphs that illustrate changes in the assist output of the motor generator 12, etc., in the case where the water temperature of the engine 11 excessively increases. In FIG. 6, (b) indicates changes in the water temperature of the engine 11 and (a) indicates changes in the engine output with the changes in the water temperature. In FIG. 6, (c) indicates the assist output of the motor generator 12 controlled based on the changes in the water temperature. In FIG. 6, (d) indicates changes in the discharge output of the main pump 14 (corresponding to a load applied on the main pump 14) and (e) indicates the output of the main pump 14. In FIG. 6, (f) indicates the state of charge (SOC) of the electric energy storage part (capacitor) 19 of the electric energy storage system 120 that supplies electric power to the motor generator 12.

The control example illustrated in FIG. 6 is a control example in the case where it becomes unable to keep the state of charge SOC of the electric energy storage part 19 sufficiently higher than the system lower limit value while supplying electric power to the motor generator 12 as illustrated in (f) of FIG. 6.

The changes of the individual elements until Time t3 are the same as the changes of the individual elements in the control example illustrated in FIG. 5, so that their description is omitted. In the control example illustrated in FIG. 6, the SOC of the capacitor 19 decreases to the system lower limit value and the supply of electric power from the electric energy storage system 120 is stopped at Time t3 as illustrated in (f) of FIG. 6. Accordingly, the assist operation of the motor generator 12 is stopped at Time t3, and the assist output sharply decreases to zero from Time t3 as illustrated in (c) of FIG. 6. As a result, there is no compensation by the assist output, so that the output of the engine 11 that has decreased because of overheating is the only power that drives the main pump 14. Accordingly, the output of the main pump 14 decreases at Time t3 as illustrated in (e) of FIG. 6.

Here, at Time t4 after Time t3, the work of the hydraulic working element driven by hydraulic pressure from the main pump 14 is switched to light-load work as illustrated in (d) of FIG. 6 and can therefore be covered by the decreased output of the engine 11. Accordingly, after Time t4, the load on the engine 11 is reduced, and the output of the engine 11 increases after Time t4 to return to the original output at Time t5 as illustrated in (a) of FIG. 6. As a result, the output of the main pump 14 also increases from Time t4 to return to the normal output at Time t5.

Thus, according to the control example illustrated in FIG. 6, the driving of the motor generator 12 is controlled so that the assist is started when the water temperature increases to the first threshold TH1 and the assist is stopped when the SOC of the capacitor 19 decreases to the system lower limit value. As a result, even when the engine output is decreased because of the overheat of the engine 11, it is possible to compensate for the decrease in the engine output with the assist output of the motor generator 12, so that it is possible to maintain the output of the main pump 14 at the same level as in a normal state, when the SOC of the capacitor 19 is higher than the system lower limit value.

Next, a description is given of a control example in the case of causing the motor generator 12 to perform an assist operation based on a decrease in the output of the main pump 14.

Figure 7:
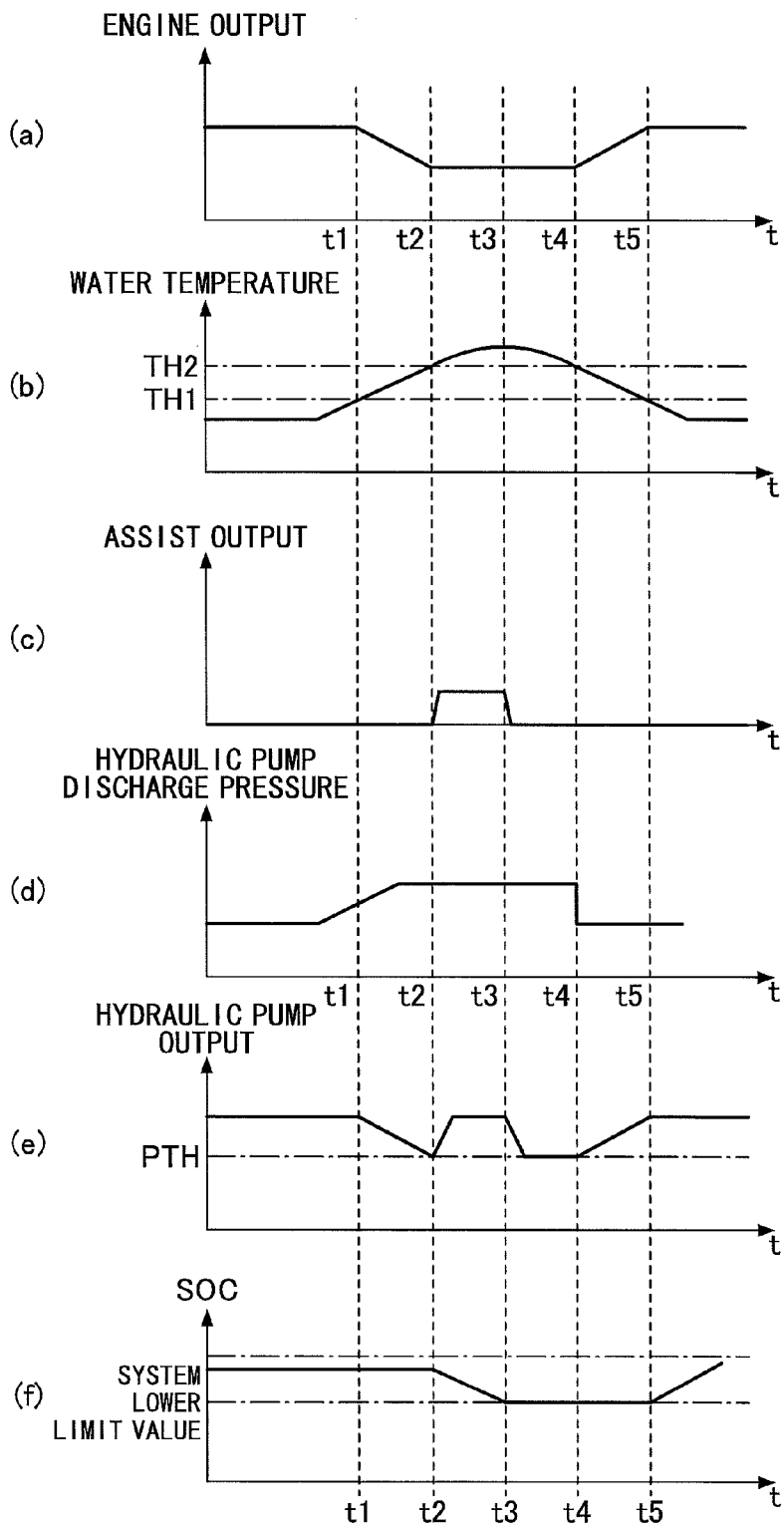
FIG. 7 illustrates graphs that illustrate changes in the assist output of the motor generator, etc., in the case of causing the motor generator to perform an assist operation based on a decrease in the output of a main pump when the engine water temperature excessively increases.

Like FIG. 5, FIG. 7 illustrates graphs that illustrate changes in the assist output of the motor generator 12, etc., in the case of causing the motor generator 12 to perform an assist operation based on a decrease in the output of the main pump 14 when the water temperature of the engine 11 excessively increases. In FIG. 7, (b) indicates changes in the water temperature of the engine 11 and (a) indicates changes in the engine output with the changes in the water temperature. In FIG. 7, (c) indicates the assist output of the motor generator 12 controlled based on the changes in the water temperature. In FIG. 7, (d) indicates changes in the discharge output of the main pump 14 (corresponding to a load applied on the main pump 14) and (e) indicates the output of the main pump 14. In FIG. 7, (f) indicates the state of charge (SOC) of the electric energy storage part (capacitor) 19 of the electric energy storage system 120 that supplies electric power to the motor generator 12.

The control example illustrated in FIG. 7 is a control example in the case where the state of charge SOC of the electric energy storage part 19 decreases to the system lower limit value while supplying electric power to the motor generator 12 as illustrated in (f) of FIG. 7.

For example, it is assumed that when the shovel is operated at a location where the outside air temperature is high, the load on the main pump 14 (hydraulic pump) starts to increase before Time t1 and becomes a constant load between Time t1 and Time t2 as illustrated in (d) of FIG. 7. At this point, the temperature of the cooling water (water temperature) of the engine 11 gradually increases with the increase in the discharge pressure of the main pump 14, and exceeds the first threshold TH1 at Time t1 to further increase. This first threshold TH1 is a temperature that is determined in advance while operating the engine 11, and is a temperature at which the output of the engine 11 starts to decrease when the water temperature exceeds the first threshold TH1. Accordingly, the output of the engine 11 starts to decrease after Time t1.

With the decrease in the output of the engine 11, the output of the main pump 14 also starts to decrease from Time t1. Then, as illustrated in (e) of FIG. 7, the output of the main pump 14 decreases to a pump output threshold PTH at Time t2. The controller 30 constantly monitors the output of the main pump 14, and issues a command to assist the engine 11 by causing the motor generator 12 to perform an electric motor operation when the output of the main pump 14 decreases to the pump output threshold PTH.

The discharge pressure of the main pump 14 stops increasing and becomes constant before Time t2. Therefore, the engine output stops decreasing at Time t2 and thereafter remains a substantially constant value.

Here, at Time t2, the motor generator 12 starts to assist the engine 11. Therefore, as illustrated in (c) of FIG. 7, the assist output of the motor generator 12 increases from Time t2 to become a constant value. The motor generator 12 is driven with electric power from the capacitor 19 to perform an assist operation. As illustrated in (f) of FIG. 7, however, the state of charge SOC of the capacitor 19 decreases to the system lower limit value at Time t3. Therefore, the controller 30 causes the motor generator 12 to stop the assist operation at Time t3 to prevent the state of charge SOC of the capacitor 19 from becoming lower than the system lower limit value.

Thus, when the output of the main pump 14 decreases to the pump output threshold PTH because of a decrease in the engine output due to an increase in the water temperature, the controller 30 causes the motor generator 12 to start an assist operation at Time t2. When the SOC of the capacitor 19 decreases to the system lower limit value, the controller 30 causes the motor generator 12 to stop the assist operation at Time t3.

Accordingly, as illustrated in (e) of FIG. 7, the output of the main pump 14 starts to decrease from Time t1 and decreases to the pump output threshold PTH at Time t2, but after Time t2, returns to the output at the time of the normal state of the engine output because of the supply of the assist output of the motor generator 12. Then, the output of the main pump 14 starts to decrease again at Time t3 because of the stoppage of the assist operation of the motor generator 12, and decreases to the pump output threshold PTH. At this time, because the SOC of the capacitor 19 is the system lower limit value, the assist operation of the motor generator 12 is not performed.

At Time t4 after Time t3, the work of the hydraulic working element driven by hydraulic pressure from the main pump 14 is switched to light-load work as illustrated in (d) of FIG. 7, and the hydraulic load can therefore be covered by the decreased output of the engine 11. Accordingly, after Time t4, the load on the engine 11 is reduced, and the output of the engine 11 increases after Time t4 to return to the original output at Time t5 as illustrated in (a) of FIG. 7. As a result, the output of the main pump 14 also increases from Time t4 to return to the normal output at Time t5.

Thus, according to the control example illustrated in FIG. 7, the driving of the motor generator 12 is controlled so that the assist is started when the output of the main pump 14 decreases to the pump output threshold PTH and the assist is stopped when the SOC of the capacitor 19 decreases to the system lower limit value. As a result, even when the engine output is decreased because of the overheat of the engine 11, it is possible to compensate for the decrease in the engine output with the assist output of the motor generator 12, so that it is possible to maintain the output of the main pump 14 at the same level as in a normal state, when the SOC of the capacitor 19 is higher than the system lower limit value.

Next, a description is given of a control example in work in a low atmospheric pressure environment such as a highland. The atmospheric pressure at a location where the shovel works (that is, the ambient atmospheric pressure of the engine 11) corresponds to one of the external conditions that reduce the output of the engine 11.

Figure 8:
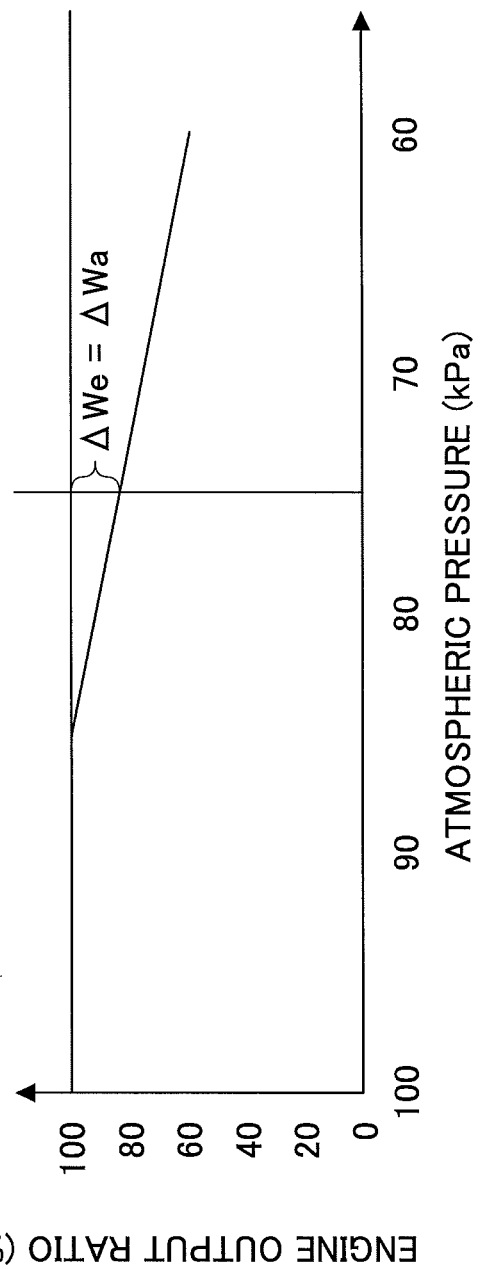
FIG. 8 is a graph illustrating the relationship between the atmospheric pressure and the engine output ratio.

FIG. 8 is a graph illustrating the relationship between the atmospheric pressure and the engine output ratio. The engine output ratio (%) is a value that expresses the ratio of the instantaneous engine output to the engine output at an atmospheric pressure at the level ground in percentage. The output of the engine 11 decreases as the atmospheric pressure decreases.

Therefore, letting reduction in the output of the engine 11 at a certain atmospheric pressure be $\Delta We$, the assist output of the motor generator 12 is increased by $\Delta Wa$ corresponding to $\Delta We$. As a result, the output that can be delivered to the main pump 14 becomes $((We-\Delta We)+Wa+\Delta Wa=Whd)$, so that it is possible to maintain the output of the main pump 14 at the output at the time of operations at an atmospheric pressure at the level ground. As a result, even in the case of performing work with a shovel at a highland where the atmospheric pressure is low, it is possible to perform the same work as work at a normal atmospheric pressure at the level ground, so that it is possible to prevent a decrease in working efficiency.

As described above, when the atmospheric pressure is lower than normal, the output of the engine 11 decreases. As a result, the output of the main pump 14 also decreases. Therefore, in the control example illustrated in FIG. 9, in such a case where a hydraulic load cannot be covered by the output of the main pump 14 that has decreased because the work of a hydraulic working element has become heavy-load work, the assist operation of the motor generator 12 is performed to compensate for a deficiency in the output of the main pump 14.

Figure 9:
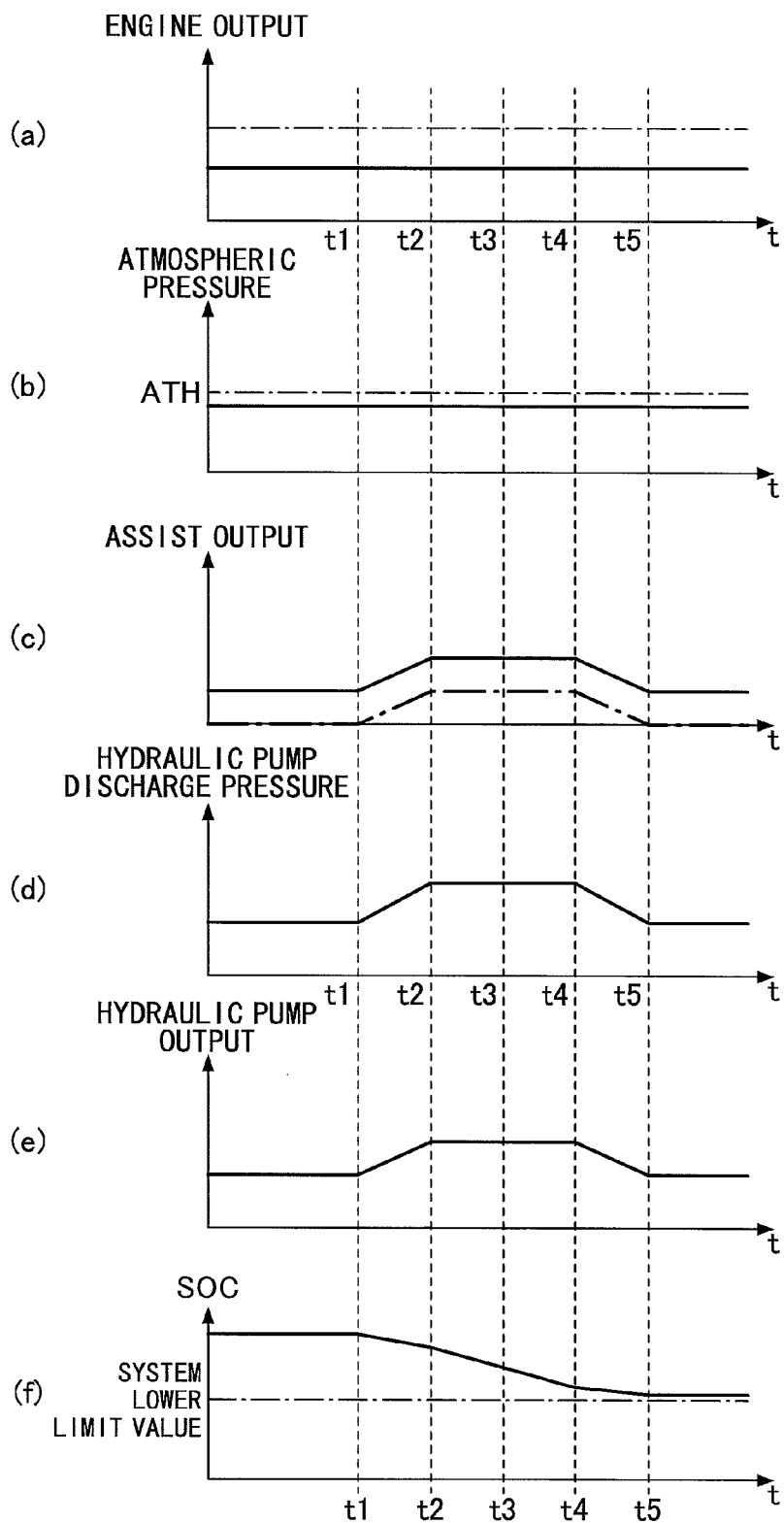
FIG. 9 illustrates graphs that illustrate changes in the assist output of the motor generator, etc., in the case where the atmospheric pressure is lower than an atmospheric pressure threshold.

FIG. 9 illustrates graphs that illustrate changes in the assist output of the motor generator 12, etc., in the case where the atmospheric pressure detected with the atmospheric pressure sensor 40 is lower than an atmospheric pressure threshold ATH. In FIG. 9, (b) indicates the atmospheric pressure of an environment in which the shovel is located, and the atmospheric pressure is lower than the atmospheric pressure threshold ATH. The atmospheric pressure threshold ATH, which is a pressure value for determining whether to assist the driving of the main pump 14 by causing the motor generator 12 to perform an assist operation, is a preset value. That is, when the hydraulic load increases with an atmospheric pressure lower than the atmospheric pressure threshold ATH, the output of the main pump 14 is increased by causing the motor generator 12 to perform an assist operation.

In FIG. 9, (a) is a graph illustrating changes in the output of the engine 11 (engine output). The engine output indicated by a solid line is decreased because of a low atmospheric pressure. A dot-dash line in (a) of FIG. 9 indicates the engine output at the time of a normal atmospheric pressure.

Thus, when the work of a hydraulic working element is light-load work with the engine output being decreased, there is no problem because the work can be covered by the decreased engine output. When the work of a hydraulic working element is heavy-load work, however, the work may not be covered by the decreased engine output. In this case, the controller 30 causes the motor generator 12 to perform an assist operation to increase power supplied to the main pump 14. As a result, the output of the main pump 14 is increased to ensure the hydraulic pressure required by the heavy-load work.

Specifically, first, when the work of a hydraulic working element is switched to heavy-load work at Time t1, the hydraulic pump load increases to become constant at Time t2 as illustrated in (d) of FIG. 9. Thereafter, at Time t4, the work of the hydraulic working element is switched from the heavy-load work to light-load work, so that the hydraulic pump load decreases to become constant at Time t5.

In the case where the atmospheric pressure is lower than the atmospheric pressure threshold ATH, when the work of the hydraulic working element is switched to the heavy-load work at Time t1, the controller 30 causes the motor generator 12 to perform an assist operation. As a result, the assist output of the motor generator 12 increases to become a constant value at Time t2 as indicated by a solid line in (c) of FIG. 9. Because the power supplied to the main pump 14 increases, the output of the main pump 14 (hydraulic pump output) increases from Time t1 to become a constant high output at Time t2. A hydraulic load for performing the heavy-load work can be covered by this output.

A dot-dash line in (c) of FIG. 9 indicates changes in the assist output in the case of performing the same work when the atmospheric pressure is higher than the atmospheric pressure threshold ATH. When the atmospheric pressure is higher than the atmospheric pressure threshold ATH (that is, a normal atmospheric pressure at the level ground), there is no assist output because of light-load work until Time t1. When the work of the hydraulic working element is switched to heavy-load work at Time t1, the assist output is needed, so that the motor generator 12 starts to deliver assist output as indicated by the dot-dash line in (c) of FIG. 9. The assist output becomes constant at Time t2 and starts to decrease from Time t4. At Time t5, the assist output becomes zero.

As shown in (c) of FIG. 9, the assist output in the case of an atmospheric pressure lower than the atmospheric pressure threshold ATH changes the same as but is globally higher by a fixed value than the assist output in the case of an atmospheric pressure higher than the atmospheric pressure threshold ATH. That is, in order to compensate for reduction in the engine output due to a decrease in the atmospheric pressure, the assist output in the case of an atmospheric pressure lower than the atmospheric pressure threshold ATH is raised by the amount corresponding to the decrease (the above-described $\Delta Wa$).

When the work of the hydraulic working element is switched from the heavy-load work to light-load work at Time t4, the controller 30 causes the motor generator 12 to stop the assist operation. As a result, the assist output decreases from Time t4 to return to the original output (the output until Time t1) at Time t5. Accordingly, the output of the main pump 14 also decreases from Time t4 to return to an output corresponding to the engine output at Time t5.

Here, the motor generator 12 is supplied with electric power from the capacitor 19 of the electric energy storage system 120 to deliver the above-described assist output. Therefore, as illustrated in (f) of FIG. 9, the state of charge SOC of the capacitor 19 starts to decrease at Time t1, when the electric motor operation (assist operation) of the motor generator 12 is started, and decreases until Time t4. At Time t4, the decrease in the SOC is reduced, and at Time t5, the SOC stops decreasing because the assist operation of the motor generator 12 is stopped. In the case of this example, the SOC is sufficiently high before causing the motor generator 12 to perform an assist operation, and the time of the assist operation of the motor generator 12 is not long. Therefore, the SOC does not become lower than the system lower limit value until the assist output is stopped (until Time t5).

Thus, according to the control example illustrated in FIG. 9, in an environment where the atmospheric pressure is lower than the atmospheric pressure threshold ATH, the driving of the motor generator 12 is controlled so that the assist by the motor generator 12 is started when the hydraulic load becomes greater than the engine output and the assist is stopped when the hydraulic load becomes smaller than or equal to the engine output. As a result, even when the engine output is decreased because of a decrease in the atmospheric pressure, it is possible to compensate for the decrease in the engine output with the assist output of the motor generator 12, so that it is possible to maintain the output of the main pump 14 at the same level as in a normal state.

According to the above-described control examples, a description is given, taking an increase in the water temperature of cooling water and a decrease in the atmospheric pressure as examples as external conditions that decrease the output of the engine 11. As external conditions (external factors) that decrease the output of the engine 11, however, various other conditions such as a change in outside air temperature and a change in fuel composition (for example, use of biofuel) are possible.

Specifically, examples of the change in fuel composition include a change in the proportion of a sulfur content in fuel. A change in the output of the engine 11 is caused by the proportion of a sulfur content in fuel. Therefore, a composition is detected or a composition is input by an operator, and a change (decrease) in the engine output may be compensated for by the assist output in accordance with the composition. Furthermore, alcohol such as ethanol may be added to gasoline as fuel. In this case as well, a change in the output of the engine 11 is caused by the amount of added ethanol. Therefore, a change (decrease) in the output may be compensated for by the assist output.

Figure 10:
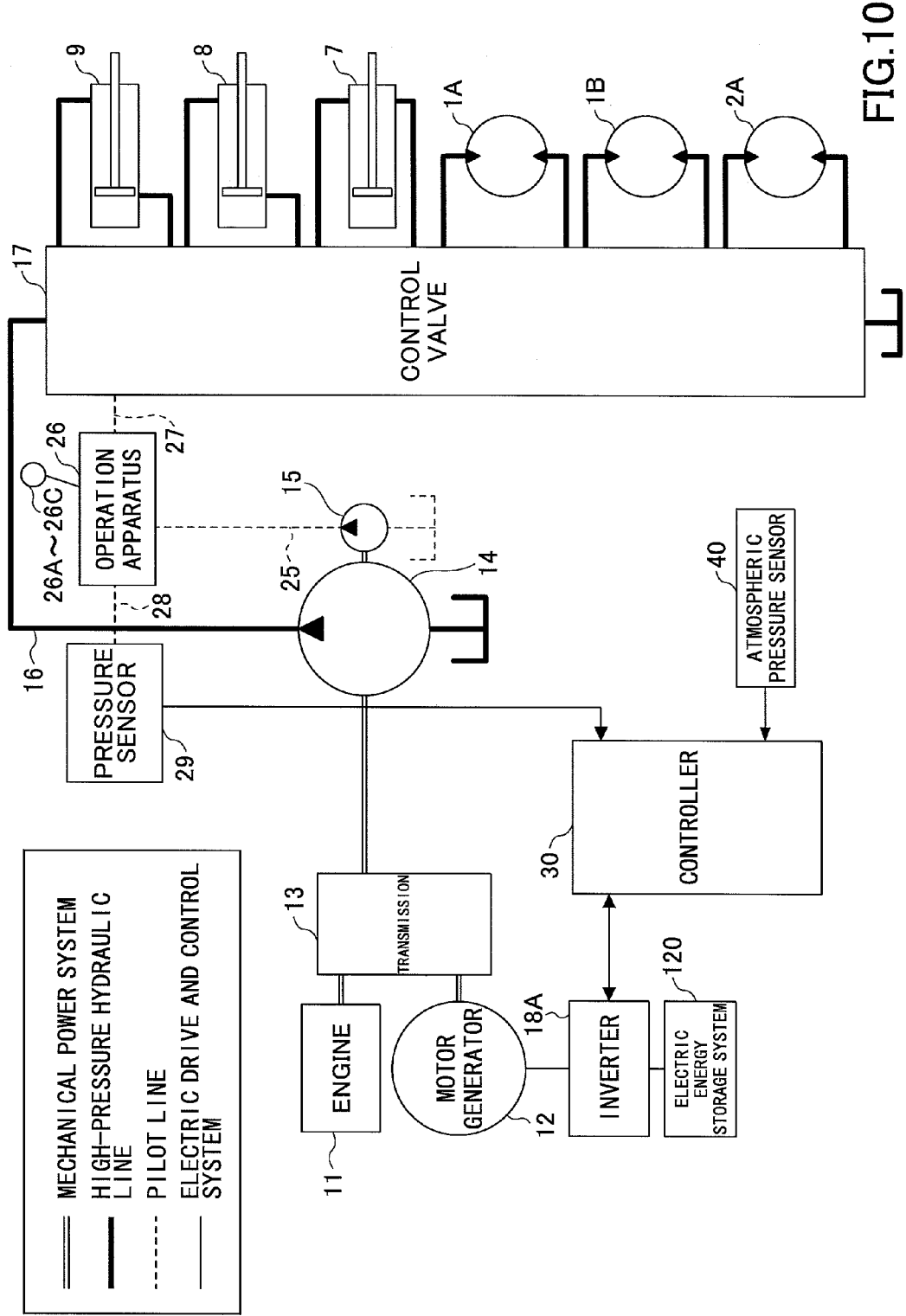
FIG. 10 is a block diagram illustrating a configuration of a drive system of a hydraulic shovel.

In the above-described embodiment, the turning mechanism 2 is electrically driven. Alternatively, the turning mechanism 2 may be hydraulically driven instead of being electrically driven. FIG. 10 is a block diagram illustrating a configuration of a drive system in the case of adopting a hydraulically driven turning mechanism in the hybrid shovel illustrated in FIG. 2. According to the hybrid hydraulic shovel illustrated in FIG. 10, in place of the turning electric motor 21, a turning hydraulic motor 2A is connected to the control valve 17, and the turning mechanism 2 is driven by the turning hydraulic motor 2A. Even in such a hybrid shovel, it is possible to maintain the output of a hydraulic pump by causing the motor generator 12 to perform an assist operation when the engine output decreases because of an external condition in the same manner as in the above-described embodiment.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

Embodiments of the present invention may be applied to hybrid work machines where an engine is assisted by an electric motor.

What is claimed is:

1. A hybrid work machine, comprising:
    an engine;
    a water temperature meter that detects a water temperature of the engine;
    a hydraulic pump driven by the engine;
    a boom attached to an upper-part turning body of the hybrid working machine, an arm attached to the boom, and an attachment attached to the arm, the boom, the arm, and the attachment being driven with hydraulic fluid discharged by the hydraulic pump;
    a motor generator connected to the engine;
    an electric energy storage unit configured to store electric power generated by the motor generator; and a control part configured to perform control on driving of the motor generator so as to start to increase an assist output of the motor generator so that the assist output of the motor generator increases as the water temperature of the engine increases, so as to compensate for a decrease in an output of the engine, when the water temperature of the engine detected by the water temperature meter exceeds a first predetermined temperature at which the output of the engine starts to decrease, and start to decrease the assist output of the motor generator when the water temperature of the engine detected by the water temperature meter becomes lower than a second predetermined temperature at which the output of the engine starts to increase, after the water temperature of the engine stops increasing and starts to decrease.

2. The hybrid work machine as claimed in claim 1, further comprising:

an atmospheric pressure sensor that detects an ambient atmospheric pressure of the engine, wherein the control part performs said control when the ambient atmospheric pressure detected by the atmospheric pressure sensor is higher than or equal to a predetermined value, and wherein the control part starts to increase the assist output of the motor generator in response to an increase in a load on the hydraulic pump, when the ambient atmospheric pressure detected by the atmospheric pressure sensor is lower than the predetermined value.

3. The hybrid work machine as claimed in claim 1, wherein the control part is configured to stop an operation of the motor generator for outputting the assist output when an amount of the electric power stored in the electric energy storage unit decreases to a lower limit value.

4. A method of controlling a hybrid work machine, the hybrid work machine including an engine, a water temperature meter, a hydraulic pump driven by the engine, a boom attached to an upper-part turning body of the hybrid working machine, an arm attached to the boom, and an attachment attached to the arm, the boom, the arm, and the attachment being driven with hydraulic fluid discharged by the hydraulic pump, a motor generator connected to the engine, an electric energy storage unit configured to store electric power generated by the motor generator, and a controller including a processor, the method comprising:

detecting, by the water temperature meter, water temperature of the engine; and performing, by the processor of the controller, control on driving of the motor generator so as to start to increase an assist output of the motor generator so that the assist output of the motor generator increases as the water temperature of the engine increases, so as to compensate for a decrease in an output of the engine, when the water temperature of the engine detected by the water temperature meter exceeds a first predetermined temperature at which the output of the engine starts to decrease, and start to decrease the assist output of the motor generator when the water temperature of the engine detected by the water temperature meter becomes lower than a second predetermined temperature at which the output of the engine starts to increase, after the water temperature of the engine stops increasing and starts to decrease.

5. The method of controlling a hybrid work machine as claimed in claim 4, further comprising:

detecting, by an atmospheric pressure sensor of the hybrid work machine, an ambient atmospheric pressure of the engine, wherein said control is performed when the ambient atmospheric pressure detected by the atmospheric pressure sensor is higher than or equal to a predetermined value, and wherein the assist output of the motor generator is caused to start to increase in response to an increase in a load on the hydraulic pump, when the ambient atmospheric pressure detected by the atmospheric pressure sensor is lower than the predetermined value.

6. The method of controlling a hybrid working machine as claimed in claim 4, wherein an operation of the motor generator for outputting the assist output is stopped when an amount of the electric power stored in the electric energy storage unit decreases to a lower limit value.

\* \* \* \* \*